Sept. 24, 1940.　　　G. J. STEVENS　　　2,215,986
INTERNAL COMBUSTION ENGINE
Filed May 1, 1939　　　3 Sheets-Sheet 1

Inventor:
George John Stevens

Patented Sept. 24, 1940

2,215,986

UNITED STATES PATENT OFFICE 2,215,986

INTERNAL COMBUSTION ENGINE

George John Stevens, Baltimore, Md.

Application May 1, 1939, Serial No. 270,962

6 Claims. (Cl. 123—78)

This invention relates to internal combustion engines and more particularly to a novel engine structure whereby the advantages hereinafter set forth are obtained.

In the modern high speed, high compression engine, it is necessary to operate with an advanced spark, so that the ignition of the fuel takes place in each cylinder, during each cycle, while the piston is compressing the vaporized fuel and prior to the piston's reaching its dead center position at the end of the compression stroke. Usually the ignition of the fuel takes place when the crank is about 15° before the dead center position. When the fuel ignites, the pressure in the cylinder builds up very rapidly, the greatly increased pressure being generally referred to as "explosion pressure." As the piston traverses the remainder of its compression stroke, it is required to overcome the very great resistance of the explosion pressure until it reaches the dead center position, at which time the explosure pressure performs useful work by actuating the piston through its power or work stroke.

Thus, during each cycle a substantial amount of energy or power is expended in forcing the piston to move through the later part of its compression stroke against the resistance of the explosion pressure. Moreover, this energy is practically wasted, for the compression action of the piston after ignition serves no useful purpose.

It will be seen, therefore, that this places a useless drag or load upon each piston, and when this is multiplied by the number of pistons, the loss of power becomes very appreciable, particularly in engines having a substantial number of cylinders, such as the V type engine. Furthermore, this action subjects the engine to excessive strain and wear, for it imposes added strain on the engine parts, such as the wrist pins, connecting rod, bearings, etc. and in many instances, the engine "knocks" due to the fact that the piston is operated against a very highly compressed vaporous body, which is almost the equivalent of a solid body. Thus, this action not only decreases the efficiency of the engine but it also imposes increased wear and tear on the engine parts and frequently causes undesired and destructive "knocking."

The principal object of the present invention is to provide a novel engine structure which eliminates the above mentioned action and its attending objectionable effects, and which materially increases the engine efficiency and gives added life to the engine parts.

A more specific object of the invention is to provide a novel engine structure which alleviates the extremely high pressure resistance, to which each piston of the conventional engine is subjected during the later part of the compression stroke.

Another object of the invention is to provide a novel engine structure which effectively delays the application of excess pressure on the piston until the commencement of the power or work stroke when such force may serve a useful purpose. The effect of this action is to eliminate the sharp peak of useless energy dissipation at the instant of explosion and to convert this energy into useful work distributed over the work portion of the cycle.

A further object of the invention is to provide novel means for cushioning each piston so as to absorb the shock due to the sudden creation of explosion pressure during the later part of the compression stroke.

Still another object of the invention is to provide a novel engine structure, which permits further advance of the spark or ignition with the attending advantages thereof.

Other objects and features of the invention will appear hereinafter as the description proceeds.

Figure 1:
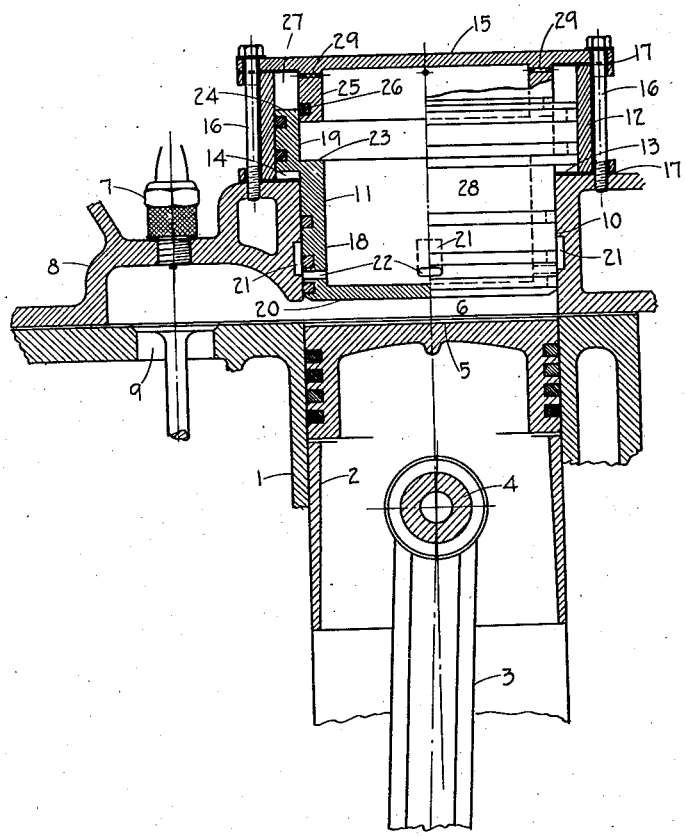
Fig. 1 is a fragmentary sectional view taken through one of the cylinders of an engine constructed according to the invention and showing the piston during the compression stroke, in a position about 15° (crank degrees) before its dead center position.

Referring now to the drawings, there is shown a cylinder 1, having a reciprocable work piston 2 therein, to which the usual connecting rod 3 is connected by wrist pin 4. Adjacent the working face 5 of piston 2 there is provided a space 6 which constitutes the combustion or explosion chamber, the fuel being ignited by the usual spark plug 7 mounted in head 8. The usual valve structure is shown at 9.

In accordance with the present invention, the head is constructed so as to provide an auxiliary cylinder 10 above the combustion chamber 6, and within the cylinder 10, there is provided a freely movable or "floating" piston 11. As an extension of cylinder 10, there is mounted on the head, a cylindrical member 12 of greater internal diameter than cylinder 10 thus providing a cylinder having an annular shoulder 13, above which there is an annular air space 14. A cap or head 15 closes the auxiliary cylinder formed by portions 10 and 12. The cylindrical member 12 and the cap 15 are provided with flanges through which bolts 16 extend, the bolts being secured to head 8, as illustrated. Suitable gaskets 17 provide an air sealed structure.

The piston 11 comprises a hollow lower portion 18 and a hollow upper portion 19 of larger diameter, the said portions being disposed respectively within the portions 10 and 12 of the auxiliary cylinder.

Each said portion of piston 11 has suitable piston rings snugly engaging the cylinder walls, as illustrated. The bottom 20 of the piston is solid. A plurality of ports 21 in the form of recesses are provided in the inner wall of cylinder 10, and there are provided in piston 11 a corresponding plurality of ports 22 adapted to cooperate respectively with the ports 21 in the manner described hereinafter.

The piston 11 has an annular shoulder 23 and an annular end surface 24. The cap or head 15 has an integral depending annular ring 25 between which and the cylindrical member 12 the upper end of piston 11 extends.

The ring 25, carries a sealing ring 26 which provides an air seal between ring 25 and the upper end of piston 11. The annular air space 27 above the end surface 24 of piston 11 communicates with the space 28, within piston 11, through ports 29.

Each cylinder of the engine has associated with it a structure of the character above described. Since each cylinder and its associated structure operates in the same manner, it will suffice to describe the operation of one such unit of the engine.

At standstill, the auxiliary piston 11 will be in its lowermost position, as shown in Fig. 1, the ports 22 being in the position shown. The air within the inner piston space 28 and the space 27 will be at a pressure not lower than atmospheric pressure. The air trapped in the sealed annular chamber 14 will be at least at atmospheric pressure, and prevents the piston from striking shoulder 13.

Figure 2:
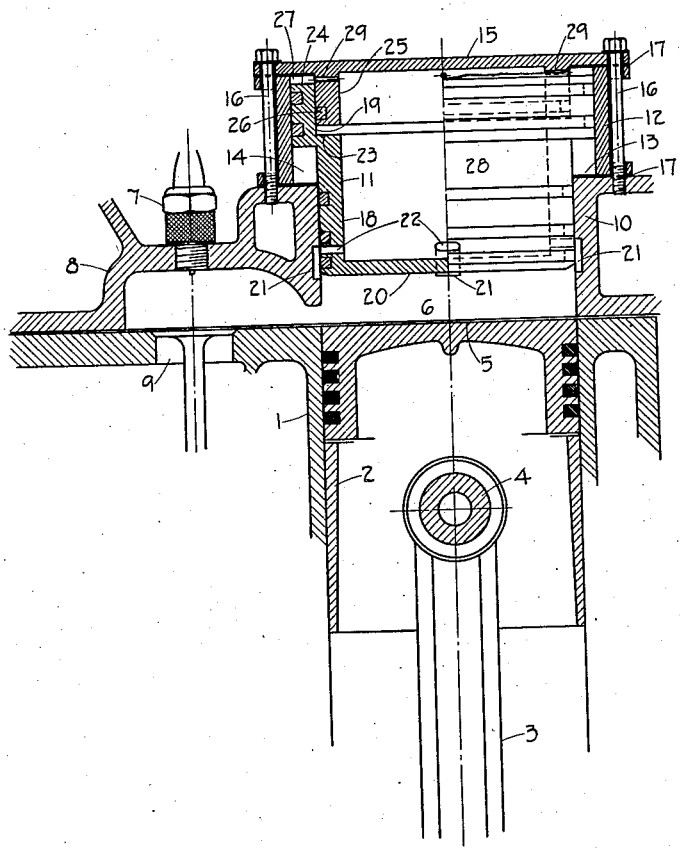
Fig. 2 is a similar view, showing the piston in dead center position at the end of the compression stroke.

Upon starting of the engine, the first explosion which may be assumed to take place when piston 2 is in the position of Fig. 1, instantly increases the pressure within the combustion chamber 6 to a value such that the auxiliary piston 11 is forced upward so that it assumes the position of Fig. 2 when the piston 2 is in dead center position. The upward movement of piston 11 enlarges the combustion chamber 6 and also places the chamber 28 in communication with the combustion chamber 6 through ports 21 and 22. In the meantime, the air within the chamber 28 and above the annular surfaces 23 and 24 prevents the piston 11 from striking ring 25 and cap 15.

The opening of ports 21 and 22 causes the pressure to build up instantly within chamber 28 and the annular chamber 27 as piston 2 approaches its dead center position.

Figure 3:
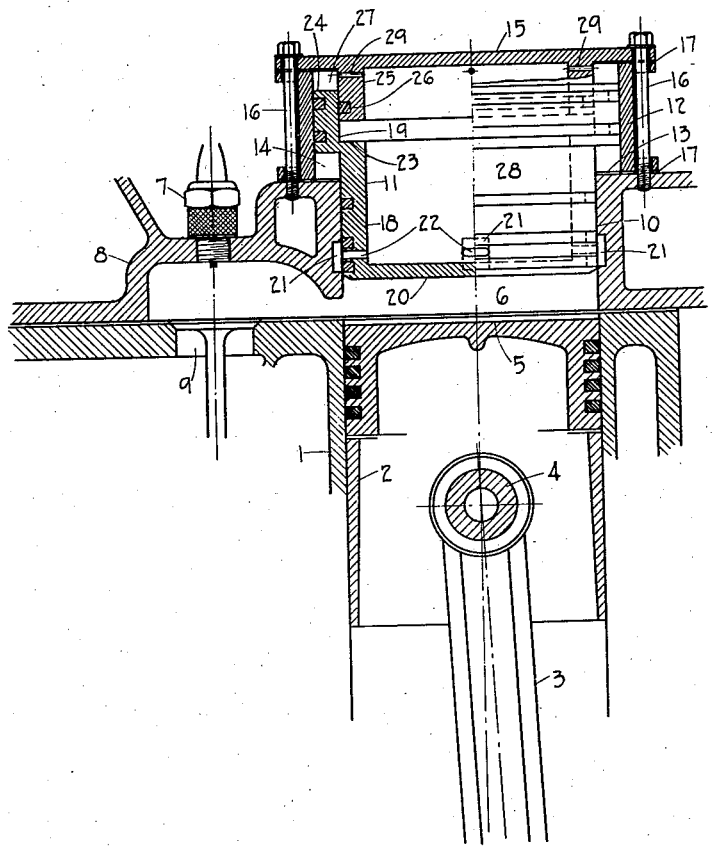
Fig. 3 is a similar view showing the piston during the power stroke, in a position about 15° beyond the dead center position.

When the pressure above the working surfaces of piston 11 is nearly but not quite equal to the pressure in the combustion chamber 6, the piston 11 starts downward. It is important to note that total area of the upper working surfaces of piston 11 which includes the surfaces 23 and 24, is greater than the working surface of piston 2 and the lower surface 20 of piston 11, and therefore slightly less pressure above piston 11 than below the piston will force the piston downward. As a result, the ports 21 and 22 are closed when the working piston 2 reaches the position of Fig. 3 just beyond the dead center position. During the downward movement of piston 11, the volume of chamber 28 increases thereby decreasing slightly, the pressure therein. Thereafter, the piston 2 operates through its power stroke and piston 11 moves fully to its lowermost position, thus prolonging the application of pressure to the working face of piston 2.

It will be seen that the piston 11 constitutes a movable head for the combustion chamber, and this moving head together with the chamber 28 delays the application of extreme force to piston 2 until after the latter has commenced its power stroke and distributes the force more uniformly through the power stroke.

The above described action serves to "charge" the auxiliary chamber or cylinder 28 to a pressure nearly equal to the explosion pressure. This charging process, if not completed during the first cycle, will be completed during the first few cycles. Thereafter the auxiliary chamber will be maintained "charged" but during each cycle the pressure in this chamber will decrease slightly as the piston 11 lowers and during the next compression stroke the piston rises, thus increasing the pressure. Thus on each compression stroke the piston 11 cushions the work piston. The above described action alleviates the extremely high-pressure resistance to movement of piston 2 during the later part of the compression stroke and provides a cushioning effect which absorbs a substantial part of the terrific shock incident to explosion. Thus the device substantially reduces the loss of power and tendency to knock in modern engines.

Furthermore, better combustion is assured, owing to the pressure in the combustion chamber being equalized during a substantial part of the cycle which may be governed by the height of the ports in the piston 11. Such equalization may extend for 30° to 45° (crank degrees) beyond dead center position. Moreover, the downward movement of the piston 11 tends to create a turbulence in the gases which are in a state of combustion, and the turbulent action enhances the combustion process.

It is possible also to provide earlier ignition in such an engine, owing to the reciprocating movement of piston 2 and the elimination of excessive pressure. Thus, the invention eliminates undesirable inherent characteristics of the conventional engine and increases the efficiency of the engine.

It will be seen from the above description that the ports 21 and 22 serve to charge the auxiliary chamber 28 to a certain pressure and to maintain that pressure. In some engines, such as Diesel type engines, the ports could be eliminated and the chamber 28 could be charged by an external source of compressed fluid. For example, compressed air could be supplied to this chamber and the pressure could be automatically controlled by a pressure-controlled valve or other suitable means. In such case, the piston 11 would operate as above described, increasing the pressure in chamber 28 during its upward movement and decreasing the pressure during its downward movement.

Although a specific form of the invention has been illustrated and described herein for the purpose of disclosure, it will be understood that the invention is not limited thereto but is capable of other forms of physical expression within the scope of the appended claims.

I claim:

1. In an internal combustion engine, a cylinder and a work piston therein arranged to provide a combustion chamber adjacent the working face of said piston, an auxiliary cylinder and an auxiliary piston freely movable therein, said auxiliary piston having a face in communication with said combustion chamber, said auxiliary cylinder forming an auxiliary chamber behind said auxiliary piston, and means controlled by said auxiliary piston for supplying compressed fluid directly from said combustion chamber to said auxiliary chamber during the compression stroke of said work piston, said means comprising ports in the wall of said auxiliary cylinder and cooperating ports in the wall of said auxiliary piston.

2. In an internal combustion engine, a cylinder and a work piston therein arranged to provide a combustion chamber adjacent the working face of said piston, an auxiliary cylinder having portions of different diameters, the larger diameter portion being farthest from said combustion chamber, an auxiliary piston freely movable in said auxiliary cylinder, said auxiliary piston having wall portions of different diameters disposed respectively in the said portions of said auxiliary cylinder, there being a plurality of working surfaces on said auxiliary piston exposed to the pressure within said auxiliary cylinder, the total area of said surfaces being greater than the area of said auxiliary piston exposed to the pressure of said combustion chamber, and means for supplying compressed fluid to said auxiliary cylinder.

3. In an internal combustion engine, a cylinder and a work piston therein arranged to provide a combustion chamber adjacent the working face of said piston, an auxiliary cylinder and an auxiliary piston freely movable therein, said auxiliary piston having a predetermined area exposed to the pressure in said combustion chamber and a greater total area exposed to the pressure in said auxiliary cylinder than exposed to the pressure in said combustion chamber, and means for supplying compressed fluid to said auxiliary cylinder.

4. In an internal combustion engine, a cylinder and a work piston therein arranged to provide a combustion chamber adjacent the working face of said piston, an auxiliary cylinder having portions of different diameters, the larger diameter portion being farthest from said combustion chamber, a head closing said auxiliary cylinder, an auxiliary piston freely movable in said auxiliary cylinder, said auxiliary piston having wall portions of different diameters disposed respectively in the said portions of said auxiliary cylinder, means for forming at the large diameter end of said auxiliary piston a small chamber having restricted communication with the interior of said auxiliary cylinder, and means for supplying compressed fluid to said auxiliary cylinder.

5. In an internal combustion chamber, a cylinder and a work piston therein arranged to provide a combustion chamber adjacent the working face of said piston, an auxiliary cylinder having portions of different diameters, the larger diameter portion being farthest from said combustion chamber, a head closing said auxiliary cylinder, a wall-forming member extending from said head in spaced relation to the wall of said auxiliary cylinder, an auxiliary piston freely movable in said auxiliary cylinder, said auxiliary piston having wall portions of different diameters disposed respectively in the said portions of said auxiliary cylinder, the larger diameter wall portion of said auxiliary piston extending into the space between the auxiliary cylinder wall and said wall-forming member, thereby forming a small chamber at the large diameter end of said auxiliary piston, said wall-forming member having restricted passages therein between the said small chamber and the interior of said auxiliary cylinder, and means for supplying compressed fluid to said auxiliary cylinder.

6. In an internal combustion engine, a cylinder and a work piston therein arranged to provide a combustion chamber adjacent the working face of said piston, an auxiliary cylinder and an auxiliary piston freely movable therein, said auxiliary piston having a face in communication with said combustion chamber, said auxiliary cylinder forming an auxiliary chamber behind said auxiliary piston, and means controlled by said auxiliary piston and operable by the relative pressures in said chambers for charging said auxiliary chamber and maintaining the same charged with compressed fluid supplied directly from said combustion chamber to said auxiliary chamber.

GEORGE JOHN STEVENS.